F. S. SHIRLEY.
Producing Colors on Glass, &c., by Fuming with Vapors or Gases.
No. 207,077. Patented Aug. 13, 1878.
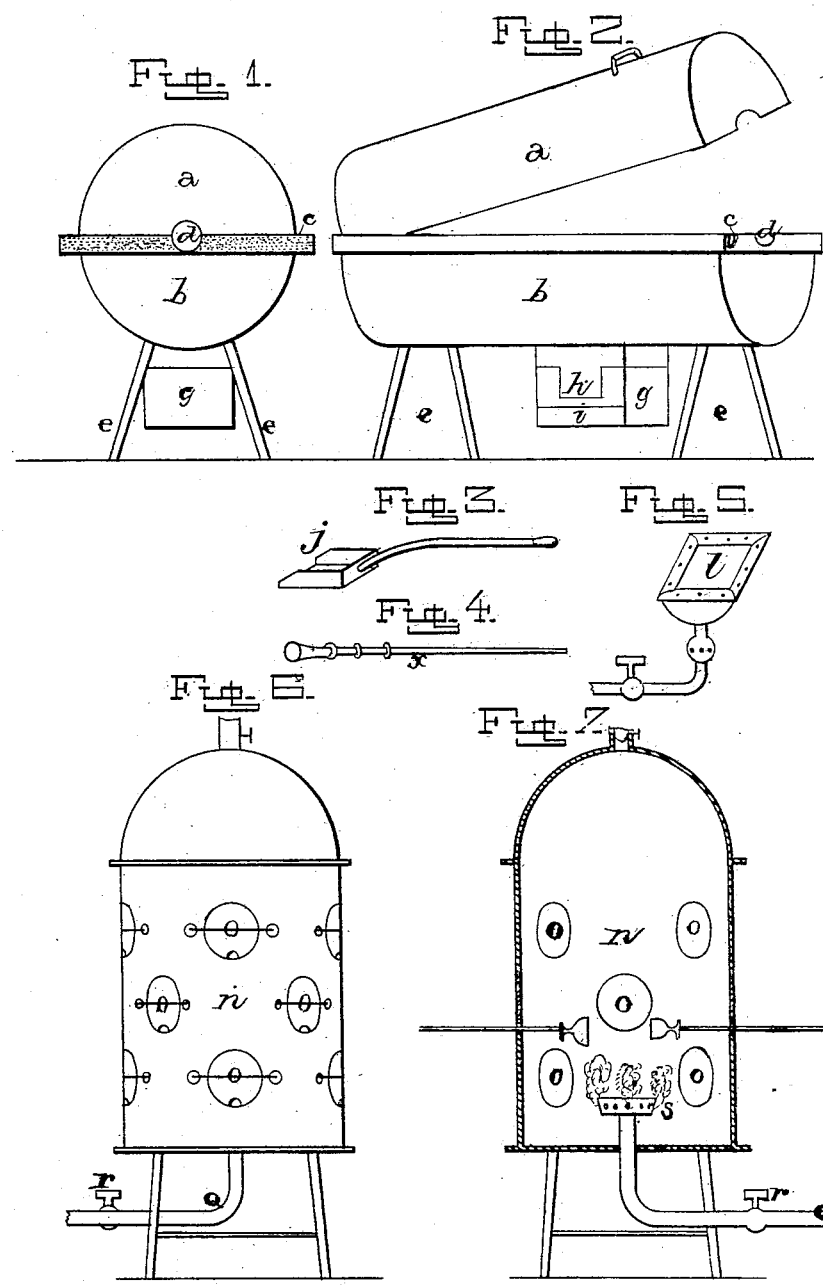

UNITED STATES PATENT OFFICE.

FREDERICK S. SHIRLEY, OF NEW BEDFORD, MASSACHUSETTS.

IMPROVEMENT IN PRODUCING COLORS ON GLASS, &c., BY FUMING WITH VAPORS OR GASES.

Specification forming part of Letters Patent No. 207,077, dated August 13, 1878; application filed December 18, 1877.

*To all whom it may concern:*

Be it known that I, FREDERICK S. SHIRLEY, of New Bedford, in the county of Bristol and State of Massachusetts, have invented certain new and useful Improvements in Producing Colors on Glass or other material by Fuming with Vapors or Gases; and I do hereby declare the following to be a full, clear, and exact description of the invention, such as will enable others skilled in the art to which it pertains to make and use it, reference being had to the accompanying drawings, which form part of this specification.

My invention relates to a new and useful method or process for producing various tints and colors on glass or other material by fuming with vapors or gases produced from chemical products, so as to produce coruscated or iridescent glassware.

It also consists in the arrangement and combination of parts, which will be more fully described hereinafter, whereby the articles can be subjected to the poisonous fumes without injury to the workmen.

The accompanying drawings represent my invention.

$a\ b$ represent a closed chamber, the upper part, $a$, being hinged to the lower part, $b$, at any suitable point, so that the part $a$ may be opened upward to give free access to the interior of the chamber. Around the upper edge of the part $b$ is made a groove or channel, C, which is to be fitted with any sealing medium, and into which the lower edges of the part $a$ rest so as to produce an air-tight joint. This air-tight joint is made for the purpose of preventing the poisonous gases or vapors to which the glassware is subjected from escaping out into the building, where they would be injurious to the workmen.

Through one end, or at any other suitable part, is made an opening, $d$, through which the article to be subjected to the fumes or gas is placed. In order to prevent the gas escaping while the article is being thus exposed, the rod $x$, to which the article or glassware is stuck, is provided with a collar, which comes up against the opening and closes it securely over. While the article is not being subjected to the action of the gas this opening may be closed by means of a cover or stopper of any suitable construction.

The chamber $a\ b$ is raised a suitable distance above the floor by means of suitable legs $e$, and to the under side of the chamber is secured a gas-producing chamber, $g$. This chamber $g$ is provided with a transparent door, $h$, through which the material to be converted into gas is introduced. Through one side, at the bottom of the chamber $g$, is made an opening, $i$, into which the heater $j$ is inserted. If preferred, and it will be found more desirable, an air-gas burner, $l$, may be used in the chamber with the heating-plate, and then the poisonous material from which the fumes are to be generated will be placed upon the plate just above the burner. The burner is to be preferred inasmuch as the heat can be regulated to any intensity at will, and can be instantly stopped or started whenever desired.

The poisonous gas generated in this chamber $g$ will rise into the chamber $b$, where the article or glassware will be subjected to its action for the purpose of giving it coruscated or iridescent colors.

In case it should be desired to expose a number of articles to the vapors or gases at the same time, a vertical chamber, $n$, will be used, through which are made any desired number of openings, $o$, each one of which openings is covered by a door, which is acted upon by a spring that holds the door pressed so tightly against the side of the chamber over the hole that no vapor can escape. Any suitable device for closing this opening $o$ may be used. When a chamber like this is used the chemicals will be placed in a closed retort, $p$, and subjected to the action of the heat. The vapor will then pass through the pipe Q, which is provided with a stop-cock, $r$, for regulating the flow of the vapor into the chamber. Inside of the chamber will be placed the vapor-distributer $s$, which will distribute the vapor evenly around throughout the whole chamber. Leading from the top of the chamber is a suitable pipe provided with a valve for letting the vapor escape into a pipe or flue conducting same away.

Glassware and other material subjected to the action of chemical vapors and fumes in a closed retort in the manner above described may be given all the hues and colors of the rainbow, and have its beauty very greatly enhanced. As a general thing the interior of each article to be acted upon by the fumes is protected so that the vapor will not come in contact with them, and this is effected by sealing them up in any suitable manner or exposing them to the vapor before they are removed from the pipe. By exposing but the outside a much more brilliant effect is produced.

The chemicals used are composed of muriate of iron, mercury, zinc, or any other substances which will give off a corrosive vapor.

A modification of this chamber may be made by using a solid cylinder, with necessary chamber attached, and having the front closed by doors properly fitted, so as to insure a tight joint.

The articles subjected to the action of the gas or fumes should be of a specific heat, and a proper retort or pot must be kept at that heat to cool down or heat up the articles to the required heat. The heat will vary with the hardness of the mixture of the glass. This heating of the glass to a certain heat insures a brilliance in the colors.

The glass can also be tinted or colored without the use of the inclosing-chamber by holding the glass in the fumes as they arise in the open air; but the use of a chamber is preferable, as the workman is thereby protected from the poisonous fumes.

Having thus described my invention, I claim—

1. The method herein described for coloring articles of glass or other material consisting in subjecting the pieces to the action of fumes or gases in a closed chamber, for the purpose of tinting or giving them a coruscated or iridescent appearance, substantially as described.

2. The combination of the closed chamber for holding the vapors and a chamber attached thereto, in which the vapor or fumes are to be generated, said chamber for holding the fumes having one or more openings through which the articles of glassware to be subjected to the action of the gas or vapor may be inserted, substantially as specified.

3. As a new article of manufacture, an article of glassware having a tinted or iridescent appearance, substantially as specified.

In testimony that I claim the foregoing I have hereunto set my hand this 4th day of April, 1877.

FRED. S. SHIRLEY.

Witnesses:
R. M. BARR,
F. A. LEHMANN.